US012570467B2

(12) United States Patent
Kim et al.

(10) Patent No.: US 12,570,467 B2
(45) Date of Patent: Mar. 10, 2026

(54) CEILING STORAGE SYSTEM AND CONTROL METHOD THEREOF

(71) Applicant: Samsung Electronics Co., Ltd., Suwon-si (KR)

(72) Inventors: Young Wook Kim, Suwon-si (KR); Seung Gyu Kang, Suwon-si (KR); Hyun Jae Kang, Suwon-si (KR); Sang Min Kim, Suwon-si (KR); Yong-Jun Ahn, Suwon-si (KR); Sang Kyung Lee, Suwon-si (KR); Hyun Woo Lee, Suwon-si (KR); Jeong Hun Lim, Suwon-si (KR); Jun Hyuk Chang, Suwon-si (KR)

(73) Assignee: Samsung Electronics Co. Ltd.

( * ) Notice: Subject to any disclaimer, the term of this patent is extended or adjusted under 35 U.S.C. 154(b) by 464 days.

(21) Appl. No.: 18/163,588

(22) Filed: Feb. 2, 2023

(65) Prior Publication Data

US 2023/0406623 A1 Dec. 21, 2023

(30) Foreign Application Priority Data

Jun. 20, 2022 (KR) ........................ 10-2022-0074593

(51) Int. Cl.
| | |
|---|---|
| *B65G 1/04* | (2006.01) |
| *B65G 47/90* | (2006.01) |
| *B65G 49/07* | (2006.01) |

(52) U.S. Cl.
CPC ......... *B65G 1/0457* (2013.01); *B65G 1/0464* (2013.01); *B65G 47/905* (2013.01); *B65G 49/07* (2013.01)

(58) Field of Classification Search
CPC .. B65G 47/905; B65G 1/0464; B65G 1/0457; B65G 49/07; H01L 21/67769; H01L 21/6773; H01L 21/67736
See application file for complete search history.

(56) References Cited

U.S. PATENT DOCUMENTS

| | | | |
|---|---|---|---|
| 7,780,392 | B2 | 8/2010 | Rogers et al. |
| 7,789,019 | B2 | 9/2010 | Kato |

(Continued)

FOREIGN PATENT DOCUMENTS

| | | |
|---|---|---|
| JP | H 08-259176 A | 10/1996 |
| JP | 2005-225598 A | 8/2005 |

(Continued)

OTHER PUBLICATIONS

Office Action in Korean Appln. No. 10-2022-0074593, mailed on Dec. 18, 2025, 20 pages (with English translation).

*Primary Examiner* — Glenn F Myers

(74) *Attorney, Agent, or Firm* — Fish & Richardson P.C.

(57) ABSTRACT

Provided is a ceiling storage system for increasing storage capacity by utilizing a ceiling space inside a fab. The ceiling storage system includes a first overhead rack including a plurality of storage positions for storing a plurality of articles; first and second support rails above the first overhead rack and extending in one direction; a first driving rail above the first overhead rack and in parallel with the first and second support rails; a second driving rail coupled to the first and second support rails and the first driving rail and moving along the first and second support rails and the first driving rail; and a first transport vehicle including a carriage coupled to the second driving rail and moving along the second driving rail, and a hoist and a hand unit installed on the carriage and for loading and unloading the articles to and from the first overhead rack.

20 Claims, 18 Drawing Sheets

(56)  References Cited

U.S. PATENT DOCUMENTS

| | | | |
|---|---|---|---|
| 8,827,618 B2 | 9/2014 | Babbs et al. | |
| 9,385,019 B2 | 7/2016 | Fosnight et al. | |
| 10,453,724 B2 | 10/2019 | Yoo et al. | |
| 10,632,610 B2 | 4/2020 | Wagner et al. | |
| 2001/0038784 A1* | 11/2001 | Peltomaki | B65G 1/1378 |
| | | | 414/273 |
| 2002/0119036 A1 | 8/2002 | Huber et al. | |
| 2005/0095087 A1 | 5/2005 | Sullivan et al. | |
| 2006/0056951 A1* | 3/2006 | Williamson | B66F 9/07 |
| | | | 414/626 |
| 2013/0259617 A1 | 10/2013 | Wang | |
| 2015/0131070 A1* | 5/2015 | Tung | G03F 7/70741 |
| | | | 355/72 |
| 2016/0126120 A1* | 5/2016 | Oza | H01L 21/67733 |
| | | | 700/121 |
| 2021/0163223 A1 | 6/2021 | Lindbo et al. | |
| 2021/0387808 A1* | 12/2021 | Kalouche | B60P 3/007 |

FOREIGN PATENT DOCUMENTS

| | | | |
|---|---|---|---|
| KR | 10-2012-0106618 A | 9/2012 | |
| KR | 10-2022-0047367 A | 4/2022 | |

* cited by examiner

Fig. 5

CEILING STORAGE SYSTEM AND CONTROL METHOD THEREOF

CROSS-REFERENCE TO RELATED APPLICATION

This application claims priority from Korean Patent Application No. 10-2022-0074593 filed on Jun. 20, 2022 in the Korean Intellectual Property Office, and all the benefits accruing therefrom under 35 U.S.C. 119, the contents of which in its entirety are herein incorporated by reference.

BACKGROUND

Example embodiments relate to a ceiling storage system and/or a control method thereof.

As the production of semiconductor devices rapidly increases, a shortage of storage capacity of a storage system installed inside a fabrication facility for producing semiconductor devices is occurring. Such a shortage of storage capacity is one of the main factors that reduce a logistical efficiency of the entire fab.

Meanwhile, a stocker and/or a portable interface buffer occupies a footprint. Therefore, if the stocker or the portable interface buffer is added, the space for installing other equipment is reduced.

Alternatively or additionally, a sidetrack buffer does not occupy the footprint as the buffer is an overhead storage facility, but should be installed only on both sides of a path of an overhead transport apparatus (e.g., overhead hoist transport (OHT)). A dead space occurs in a branching and a rotating area of the overhead transport apparatus. In addition, for fabs that are already in operation, there may be no room in which sidetrack buffers are additionally installed as an installation space is already saturated.

SUMMARY

Various example embodiments provide a ceiling storage system for increasing a storage capacity by utilizing a ceiling idle space inside a fab.

Alternatively or additionally, various example embodiments provide a control method of a ceiling storage system for increasing a storage capacity by utilizing a ceiling idle space inside a fab.

However, example embodiments are not restricted to those set forth herein. The above and other aspects of will become more apparent to one of ordinary skill in the art to which example embodiments pertain by referencing the detailed description of the present disclosure given below.

According some example embodiments, there is provided a ceiling storage system including: a first overhead rack including a plurality of storage positions for storing a plurality of articles; first and second support rails above the first overhead rack and extending in one direction; a first driving rail above the first overhead rack and arranged in parallel with the first and second support rails; a second driving rail coupled to the first and second support rails and the first driving rail and configured to move along the first and second support rails and the first driving rail; and a first transport vehicle including a carriage coupled to the second driving rail and configured to move along the second driving rail, and a hoist and a hand unit installed on the carriage and configured to load and unload the articles to and from the first overhead rack.

According to some example embodiments, there is provided a ceiling storage system including: a first overhead rack in which a plurality of storage areas and a plurality of maintenance areas are alternately arranged; first and second support rails above the first overhead rack and extending in one direction; a first driving rail above the first overhead rack and between the first support rail and the second support rail; a second driving rail coupled to the first and second support rails and the first driving rail and configured to move along the first and second support rails and the first driving rail; a first transport vehicle including a carriage coupled to the second driving rail and configured to move along the second driving rail, and a hoist and a hand unit installed on the carriage and configured to load and unload the article to and from the first overhead rack; a first interface port adjacent to the first overhead rack; a second interface port below the first overhead rack and having an opened upper surface; and a second transport vehicle configured to move along an overhead rail. The first transport vehicle is configured to pick up the article from the first overhead rack and move the article to the first interface port, and the second transport vehicle is configured to pick up and move the article from the first interface port, and the first transport vehicle is configured to pick up the article from the first overhead rack and move the article to the second interface port through the opened upper surface. In some example embodiments, an operator or an autonomous mobile vehicle picks up and moves the article from the second interface port.

According to some example embodiments, there is provided a control method of a ceiling storage system including: providing the ceiling storage system including a first overhead rack, a first support rail, a second support rail, and a first driving rail above the first overhead rack and extending a first direction, a second driving rail movably coupled to the first support rail, the second support rail, and the first driving rail, a first transport vehicle movable along the second driving rail, and a first interface port to be adjacent to the first overhead rack; moving the first driving rail along the first driving rail in the first direction; moving the first transport vehicle along the second driving rail in a second direction perpendicular to the first direction; extending a hoist of the first transport vehicle in a third direction perpendicular to the first direction and the second direction; and picking up articles loaded on the first overhead rack by a hand unit of the first transport vehicle.

These and other details of example embodiments are included in the detailed description and drawings.

BRIEF DESCRIPTION OF THE DRAWINGS

The above and other aspects and features of example embodiments will become more apparent by describing in detail various embodiments thereof with reference to the attached drawings, in which:

FIG. 5 is a plan view of the cross-type overhead hoist crane illustrated in FIG. 4;

DETAILED DESCRIPTION OF VARIOUS EXAMPLE EMBODIMENTS

Figure 1:
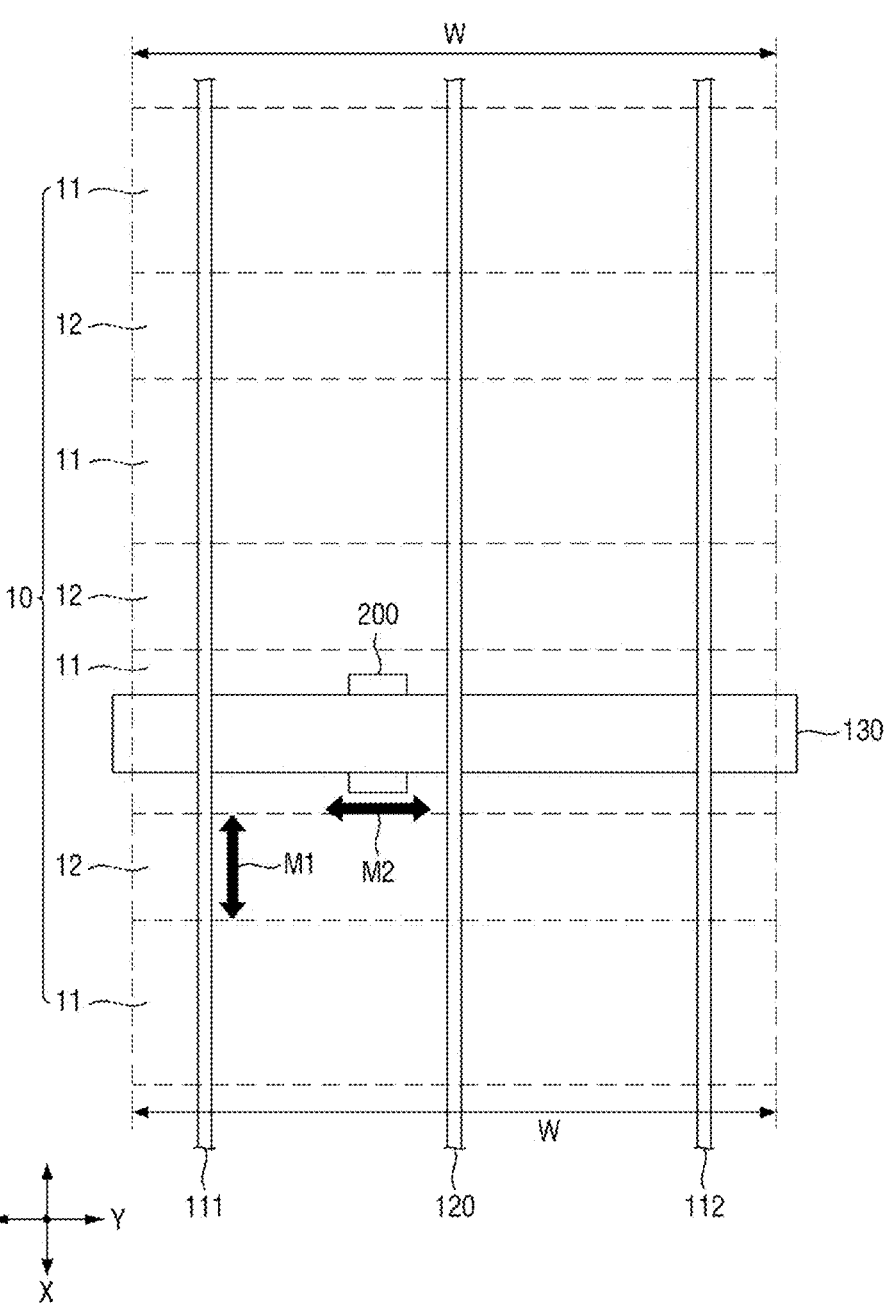
FIG. 1 is a block diagram illustrating a ceiling storage system according to various example embodiments.

Hereinafter, various example embodiments of the present disclosure will be described in detail with reference to the accompanying drawings. The same reference numerals are used for the same components in the drawings, and duplicate descriptions thereof are omitted.

Figure 2:
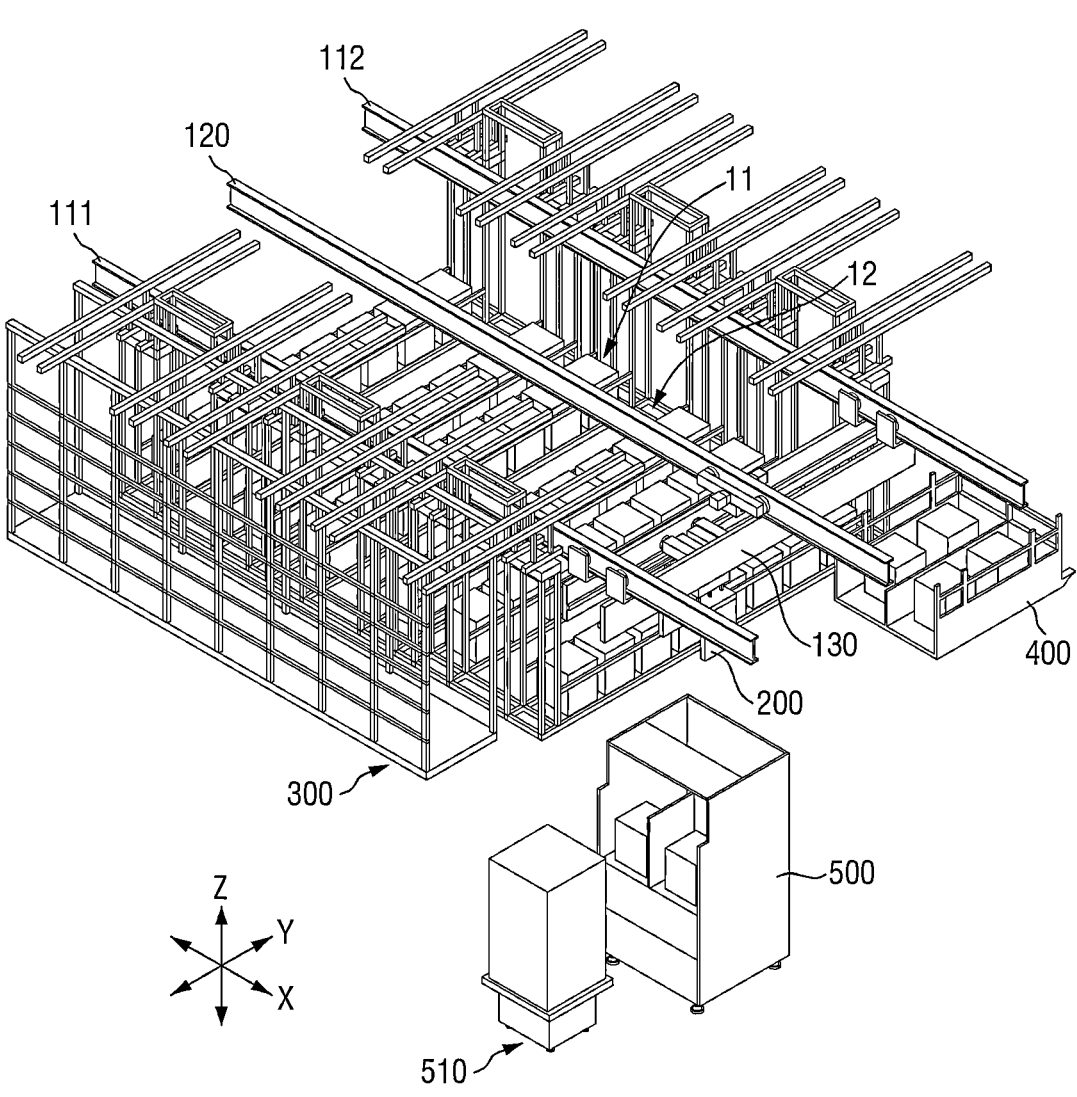
FIG. 2 is a perspective view specifically illustrating the ceiling storage system of FIG. 1.
Figure 3:
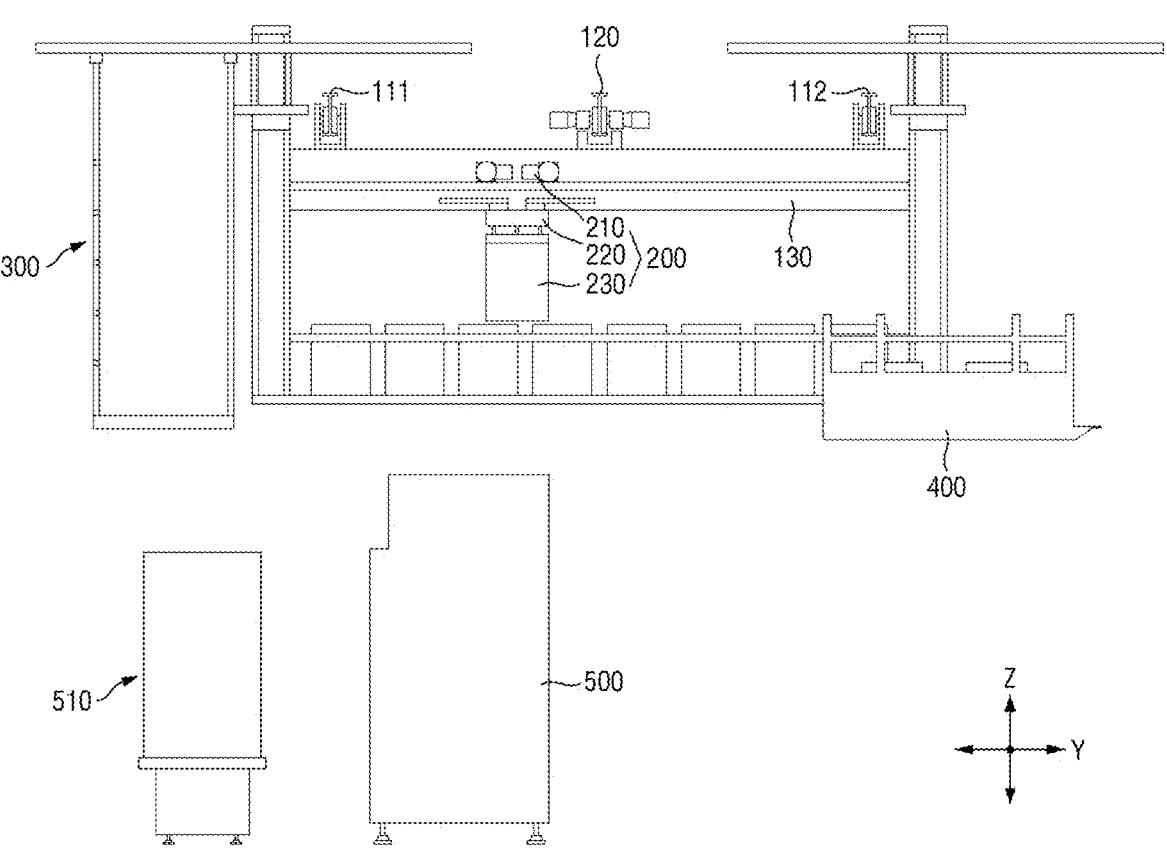
FIG. 3 is a side view illustrating the ceiling storage system of FIG. 1.

FIG. 1 is a block diagram illustrating a ceiling storage system according to various example embodiments. FIG. 2 is a perspective view specifically illustrating the ceiling storage system of FIG. 1. FIG. 3 is a side view illustrating the ceiling storage system of FIG. 1.

Referring to FIGS. 1 to 3, a ceiling storage system according to various example embodiments includes an overhead rack 10, a first support rail 111, a second support rail 112, a first driving rail 120, a second driving rail 130, a first transport vehicle 200, and the like. In the ceiling storage system according to various example embodiments, a cross type overhead hoist crane is constituted using the first driving rail 120, the second driving rail 130, and the first transport vehicle 200, and loads and unloads articles positioned on the overhead rack 10.

The overhead rack 10 may be installed on a ceiling of a fab, and may be fixed to the ceiling through a distinct attachment structure.

The overhead rack 10 includes a storage area 11 and a maintenance area 12. As illustrated, the storage area 11 and the maintenance area 12 may be alternately disposed or arranged along a first direction X.

The storage area 11 includes a plurality of storage positions for storing a plurality of articles. Here, the article may be a wafer storage container (e.g., a front opening unified pod (FOUP)), a reticle storage container, and/or the like, but is not limited thereto. Any article may be applied as long as the article may be moved by a transport vehicle/transport apparatus or the like.

The maintenance area 12 is a space for an operator (such as a fab operator, a fab technician, or a fab engineer) to enter into the overhead rack 10. The operator may take out articles placed in the storage area 11 and/or perform repairs on the overhead rack 10, through the maintenance area 12.

On the other hand, the overhead rack 10 may further include an access road 300. The access road 300 is connected to a plurality of maintenance areas 12. The operator has access to the plurality of maintenance areas 12 via the access road 300. The access road 300 is illustrated to extend in the first direction, but is not limited thereto. Any shape of the access road 300 is possible as long as the access road 300 has a shape that allows the operator to reach the plurality of maintenance areas 12.

In FIG. 1, a length of the storage area 11 in the first direction X may be longer than a length of the maintenance area 12 in the first direction X. In addition, a width W of the storage area 11 in a second direction Y may be the same as a width W of the maintenance area 12 in the second direction Y. However, the size (e.g., length and/or width) of the maintenance area 12 may be any size as long as the operator can access corners of the storage area 11. For example, the width W of the maintenance area 12 in the second direction Y may be smaller than the width W of the storage area 11 in the second direction Y.

The first support rail 111 and the second support rail 112 are disposed above the overhead rack 10. The first support rail 111 and the second support rail 112 extend along the first direction X.

The first driving rail 120 is disposed above the overhead rack 10. The first driving rail 120 may be disposed parallel to the first support rail 111 and the second support rail 112. For example, the first driving rail 120 may extend along the first direction X.

The second driving rail 130 may be coupled, e.g., movably coupled to the first support rail 111, the second support rail 112, and the first driving rail 120. Accordingly, the second driving rail 130 may move along the first support rail 111, the second support rail 112, and the first driving rail 120. For example, the second driving rail 130 may move in the first direction X (see reference numeral M1), both forward and backward. The second driving rail 130 is in three-point contact or at least three-point contact with/ supported by the first support rail 111, the second support rail 112, and the first driving rail 120.

In addition, the second driving rail 130 may extend a long in a direction different from the first direction X, for example, in the second direction Y perpendicular to the first direction X.

Figure 4:
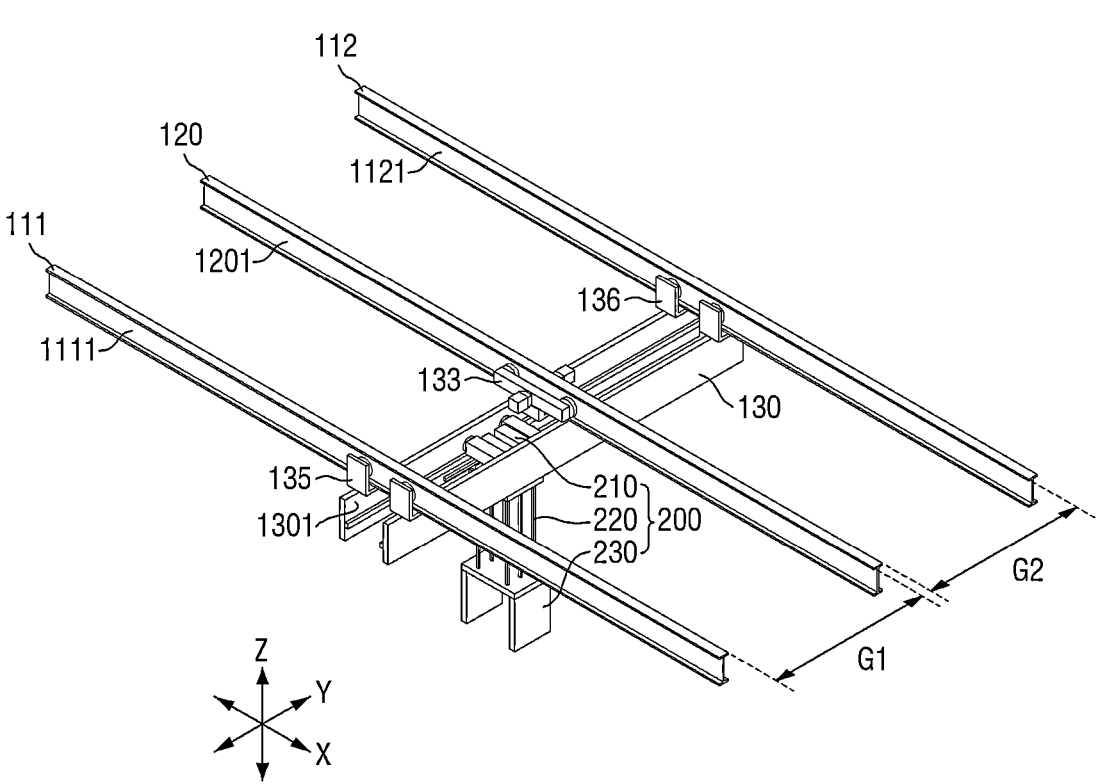
FIG. 4 is a perspective view illustrating a cross type overhead hoist crane illustrated in FIG. 2.

In addition, a driving wheel installed on the second driving rail 130 (e.g., a wheel rotating by a driving force so that the second driving rail 130 moves in the first direction X) rotates while being in contact with the first driving rail 120 (see to FIG. 4). A guide wheel installed on the second driving rail 130 (e.g., a wheel that does not receive a driving force and/or is a passive wheel) rotates while being in contact with the first support rail 111 and the second support rail 112 (see to FIG. 4). The guide wheel helps the second driving rail 130 to move stably without being inclined.

The first driving rail 120 may be disposed between the first support rail 111 and the second support rail 112, but is not limited thereto. For example, depending on the design, the first support rail 111 may be positioned between the first driving rail 120 and the second support rail 112, or the second support rail 112 may also be positioned between the first support rail 111 and the first driving rail 120.

The first transport vehicle 200 may be movably coupled to the second driving rail 130. Accordingly, the first transport vehicle 200 may move along the second driving rail 130. For example, the first transport vehicle 200 may move in the second direction Y (see reference numeral M2).

The first transport vehicle 200 includes a carriage 210, a hoist 220, a hand unit 230, and the like. The hand unit 230 may be a hand and/or a gripper; however, example embodiments are not limited thereto.

The carriage 210 moves along the second driving rail 130. A driving wheel installed on the carriage 210 (e.g., a wheel rotating by a driving force so that the carriage 210 moves in the second direction Y) may rotate while being in contact with the second driving rail 130.

The hoist 220 is installed on the carriage 210, and is for loading and unloading the articles to and from the overhead rack 10. The hoist 220 may be stretched and/or shortened along the third direction Z. The hoist 220 may be or may include one or more actuators, such as one or more linear actuators; however, example embodiments are not limited thereto.

The hand unit 230 is for stably fixing the article while the article is moved by the first transport vehicle 200. The hand unit 230 grips the article. For example, the hand unit 230 may grip a specific or preset area of the article in the form of a gripper.

In some example embodiments, a vision camera may be installed in the hand unit 230. By performing auto-teaching with the vision camera, the loading and unloading operation may be performed after detecting a position of the article in the overhead rack 10.

Meanwhile, referring to FIGS. 2 and 3, optionally or additionally, the ceiling storage system according to various example embodiments may further include a first interface port 400 and/or a second interface port 500.

The first interface port 400 is installed on the ceiling of the fab and is disposed to be adjacent to the overhead rack 10. The first interface port 400 may be disposed on a side surface of the overhead rack 10 and may also be disposed on an upper surface of the overhead rack 10. The first interface port 400 may be used to deliver the article to a transport apparatus installed on the ceiling (e.g., an overhead hoist transport (OHT) and/or another transport vehicle that moves along an overhead rail). The first interface port 400 may include, for example, a conveyor system for moving a position of the article. The conveyor system may move the article in a specific or preset direction.

For example, the first transport vehicle 200 picks up the article from the overhead rack and moves, and then places the article on the first interface port 400. The first interface port 400 moves the position of the article using the conveyor system. Another transport apparatus OHT picks up the moved article.

As another example, another transport apparatus OHT puts the article down on one side of the first interface port 400. The first interface port 400 moves the position of the article using the conveyor system. The first transport vehicle 200 picks up the moved article from the first interface port 400, and puts the article down at a designated position of the overhead rack 10.

In summary, by using the first interface port 400, the first transport vehicle 200 and another transport apparatus OHT may exchange the article. Even if the overhead rack 10 and the transport apparatus OHT are far apart from each other, it may be sufficient to elongate and install the first interface port 400 disposed between the overhead rack 10 and the transport apparatus OHT. Therefore, the position at which the overhead rack 10 is installed may be freely installed irrespective of or independent of the transport apparatus OHT.

The second interface port 500 may be installed on a bottom surface of the fab. The second interface port 500 may be installed below the overhead rack 10. The second interface port 500 may be used to deliver the article to an operator and/or to an autonomous mobile vehicle 510 (e.g., an autonomous mobile robot (AMR), an automated guided vehicle (AGV), and the like). The second interface port 500 may have an opened upper surface. The first transport vehicle 200 may load and unload the article to and from the second interface port 500 through the opened upper surface.

For example, the first transport vehicle 200 picks up the article from the overhead rack and moves, and then puts the article down inside the second interface port 500 through the opened upper surface. The operator and/or the autonomous mobile vehicle 510 takes out the article from the second interface port 500.

As another example, the operator and/or the autonomous mobile vehicle 510 puts the article down inside the second interface port 500. The first transport vehicle 200 picks up and takes the article through the opened upper surface of the second interface port 500.

The cross-type overhead hoist crane will be described in more detail with reference to FIGS. 4 to 6.

FIG. 4 is a perspective view illustrating a cross type overhead hoist crane illustrated in FIG. 2. FIG. 5 is a plan view illustrating the cross-type overhead hoist crane illustrated in FIG. 4, and FIG. 6 is a side view illustrating the cross-type overhead hoist crane illustrated in FIG. 4.

Figure 5:
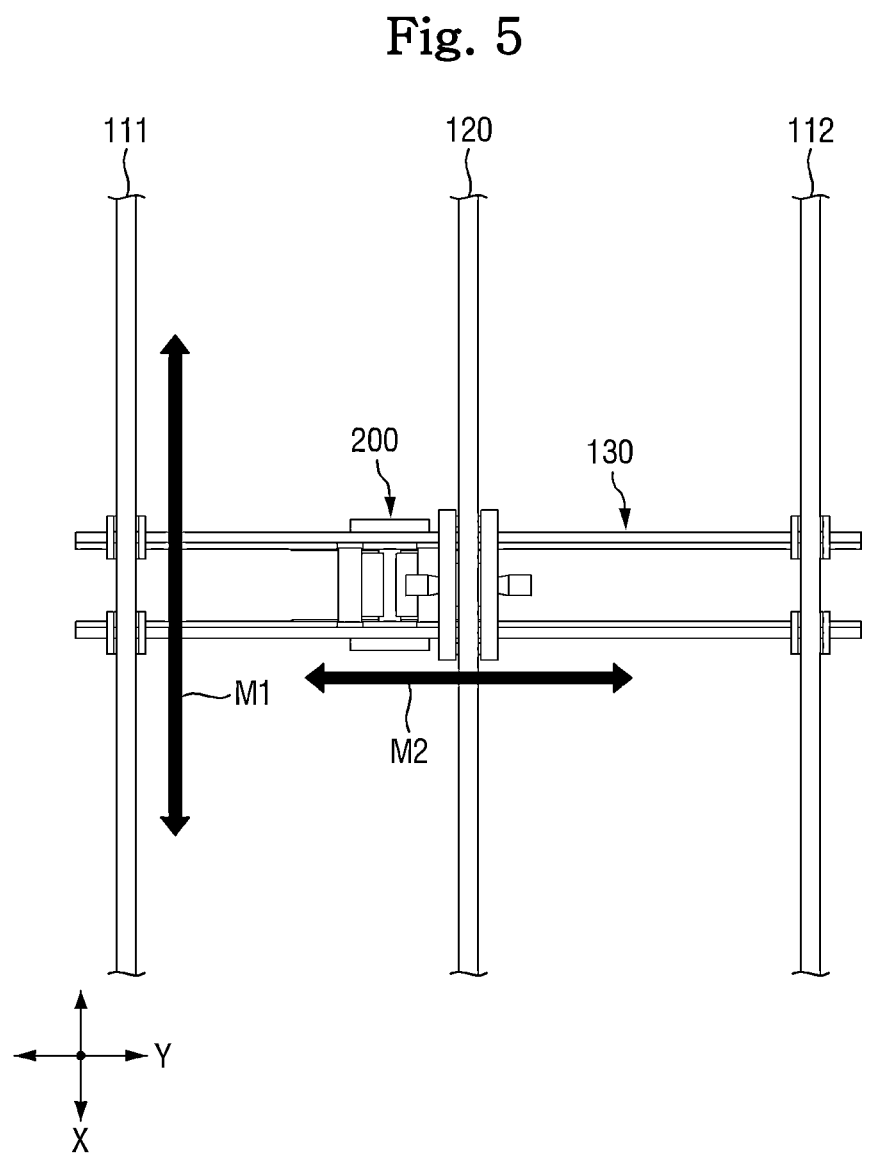
Figure 6:
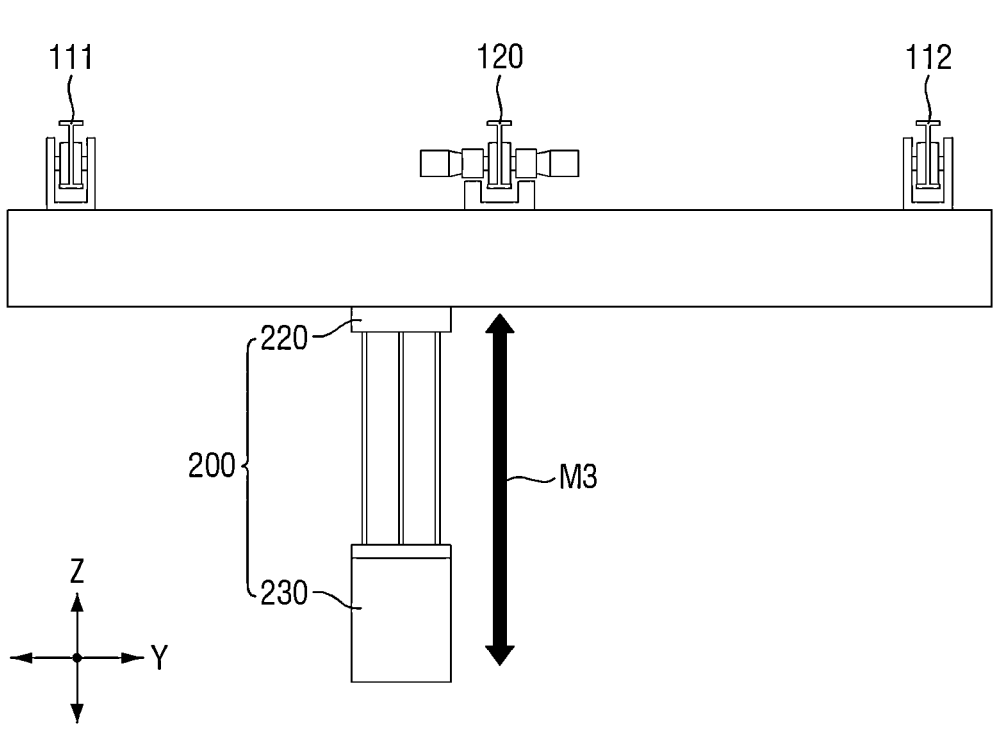
FIG. 6 is a side view of the cross-type overhead hoist crane illustrated in FIG. 4.

Referring to FIGS. 4 to 6, in the ceiling storage system according to various example embodiments, a cross type overhead hoist crane is constructed using the first driving rail 120, the second driving rail 130, and the first transport vehicle 200.

The first driving rail 120 extends to be long in the first direction X. The first support rail 111 and the second support rail 112 may extend to be in parallel to the first driving rail 120 along the first direction X.

The second driving rail 130 extends along the second direction Y different from the first direction X. The second direction Y may be a direction perpendicular to the first direction X.

The second driving rail 130 is positioned below the first driving rail 120, the first support rail 111, and the second support rail 112.

A driving wheel 133, a first guide wheel 135, and a second guide wheel 136 are installed on an upper surface of the second driving rail 130. A motor for providing a driving force may be connected to the driving wheel 133.

A groove 1201 is formed or defined in a side surface of the first driving rail 120 to be long in the first direction X, and the driving wheel 133 rotates along the groove 1201 while being in contact with the groove 1201. A groove 1111 is formed or defined in a side surface of the first support rail 111 to be long in the first direction X, and the first guide wheel 135 rotates along the groove 1111 while being in contact with the groove 1111. A groove 1121 is formed or defined in a side surface of the second support rail 112 to be long in the first direction X, and the second guide wheel 136 rotates along the groove 1121 while being in contact with the groove 1121.

Since the second driving rail 130 is movably coupled to the first driving rail 120, the first support rail 111, and the second support rail 112, the second driving rail 130 is supported at three or at least three points. For example, since a load or weight of the second driving rail 130 is distributed to the three rails 120, 111, and 112, a load condition is reduced.

Alternatively or additionally, since the center of the second driving rail 130 is supported by the first driving rail 120, and both ends of the second driving rail 130 are supported by the first support rail 111 and the second support rail 112, a length (or span) of the second driving rail 130 may be further increased. If the length of the second driving rail 130 is further increased, a gap G1 between the first driving rail 120 and the first support rail 111 may be further increased, and a gap G2 between the first driving rail 120 and the second support rail 112 may be further increased within a range that may support the load of the second driving rail 130.

Meanwhile, a movement path 1301 is installed to be long along the second direction Y inside the second driving rail 130.

The first transport vehicle 200 may move in the second direction Y along the movement path 1301.

The first transport vehicle 200 includes a carriage 210, a hoist 220, a hand unit 230, and the like.

A driving wheel installed on the carriage 210 may rotate while being in contact with the movement path 1301 of the second driving rail 130. In order to prevent or reduce the likelihood of and/or impact of the carriage 210 from colliding with the first driving rail 120, the first support rail 111, and the second support rail 112 during movement, a height of the carriage 210 is lower than a thickness of the second driving rail 130 (e.g., a length in a third direction Z). In addition, since the carriage 210 moves within the second driving rail 130, diffusion of particles or fumes that may occur while the carriage 210 moves may be reduced.

The hoist 220 is installed on the carriage 210, and is stretched or shortened along the third direction Z.

The hand unit 230 is connected to an end of the hoist 220 and serves to stably fix the article. The hand unit 230 may be or may include, for example, a multi-joint arm and a gripper installed at an end of the arm. By using the multi joint arm, the gripper may be moved to a designated position. By using the hoist 220 and the hand unit 230, the first transport vehicle 200 may pick up the article at a designated position without a distinct rotation shaft.

Here, referring to FIG. 5, the movement M1 in the first direction X is implemented by moving the second driving rail 130, and the movement M2 in the second direction Y is implemented by moving the carriage 210 of the first transport vehicle 200.

Referring to FIG. 6, a movement M3 in the third direction Z is implemented by stretching and/or shortening the hoist 220 of the first transport vehicle 200.

The overhead rack, which is an article storage area, will be described in more detail with reference to FIGS. 7 to 9.

Figure 7:
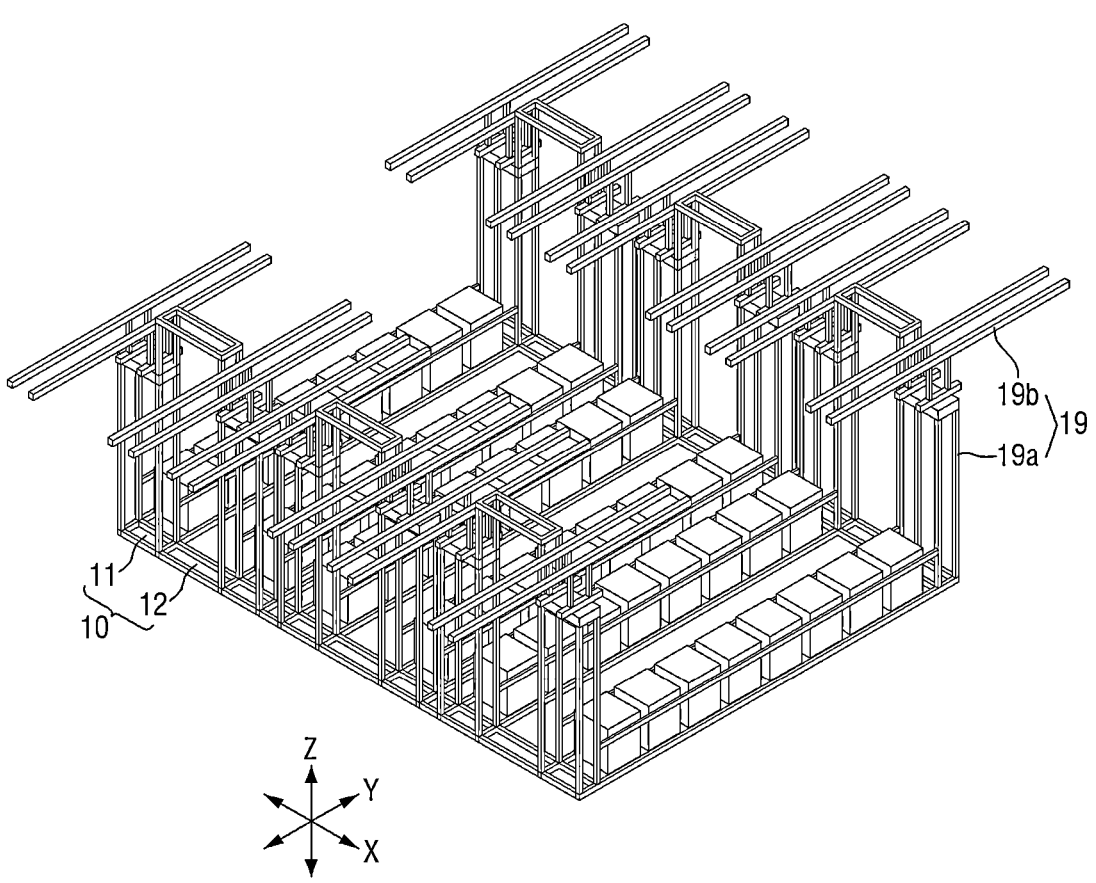
FIG. 7 is a perspective view illustrating an overhead rack illustrated in FIG. 2.

FIG. 7 is a perspective view illustrating an overhead rack illustrated in FIG. 2. FIG. 8 is a plan view of the overhead rack illustrated in FIG. 7, and FIG. 9 is a side view of the overhead rack illustrated in FIG. 7.

Figure 8:
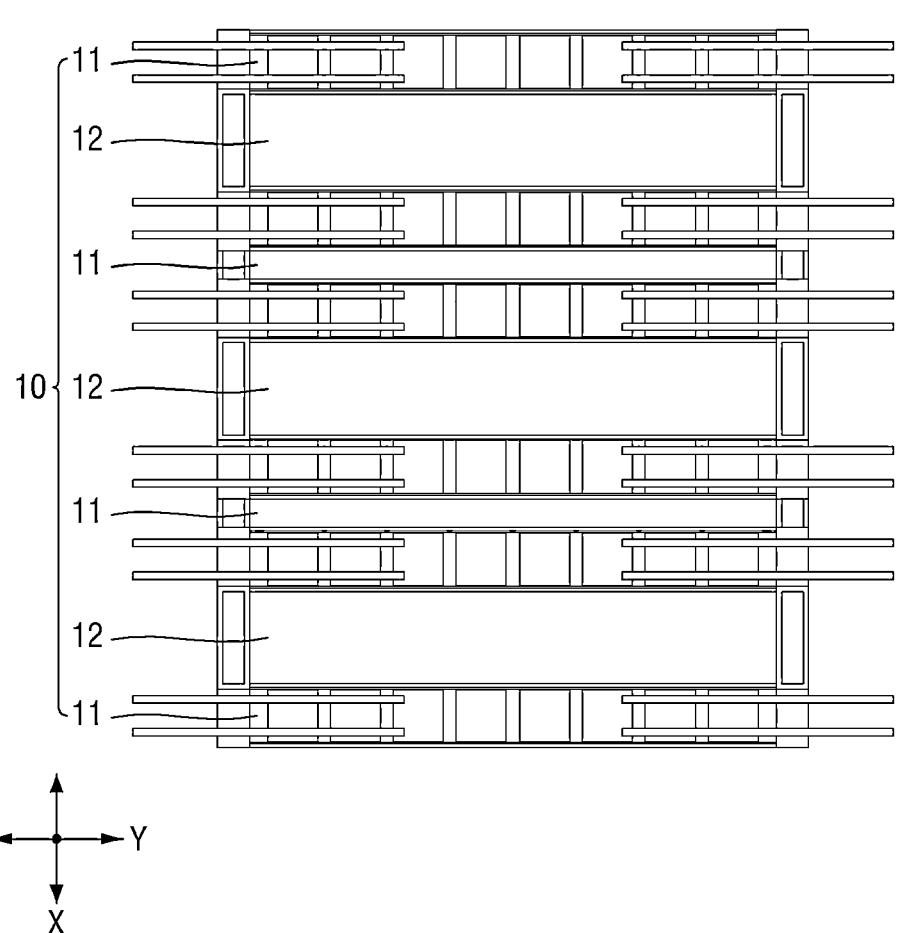
FIG. 8 is a plan view of the overhead rack illustrated in FIG. 7.
Figure 9:
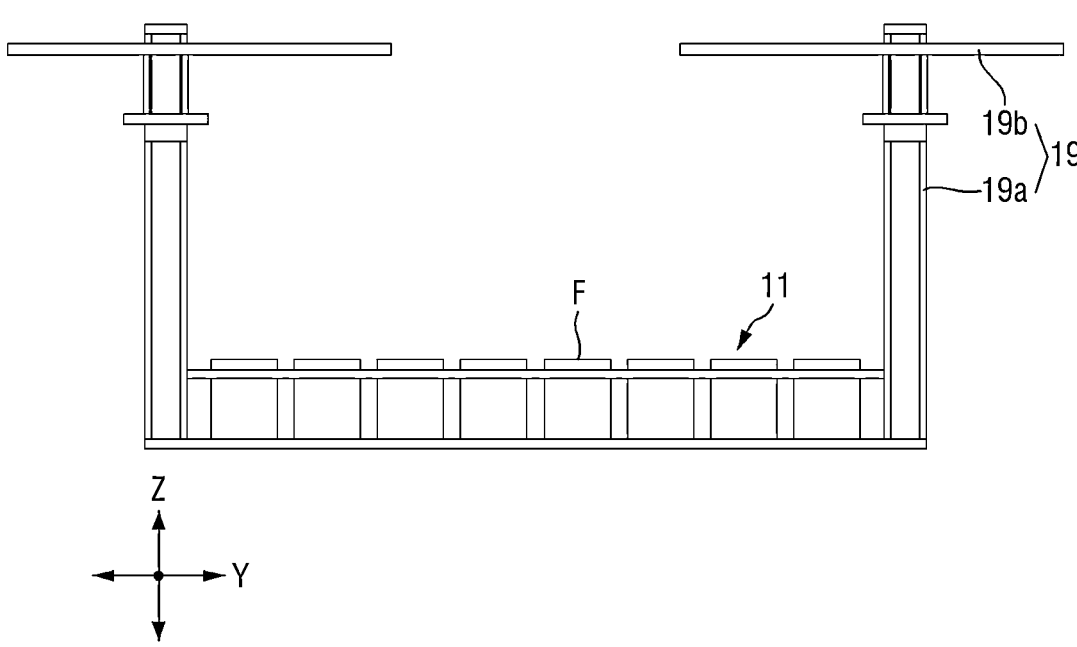
FIG. 9 is a side view of the overhead rack illustrated in FIG. 7.

Referring to FIGS. 7 to 9, the overhead rack 10 is installed on the ceiling of the fab, and is fixed to the ceiling through a distinct attachment structure 19.

The attachment structure 19 may include a first portion 19a and a second portion 19b. The first portion 19a may be connected to both sides of the overhead rack 10 and may extend in a vertical direction. The second portion 19b extends in a horizontal direction, and the first portion 19a is connected to and fixed to the second portion 19b.

As illustrated in FIG. 8, the overhead rack 10 includes a storage area 11 for storing articles, and a maintenance area 12 for an operator to enter into the overhead rack 10. A plurality of storage areas 11 and a plurality of maintenance areas 12 may be alternately disposed with each other.

A control method of a ceiling storage system according to various example embodiments will be described with reference to FIGS. 10 to 13.

Figure 10:
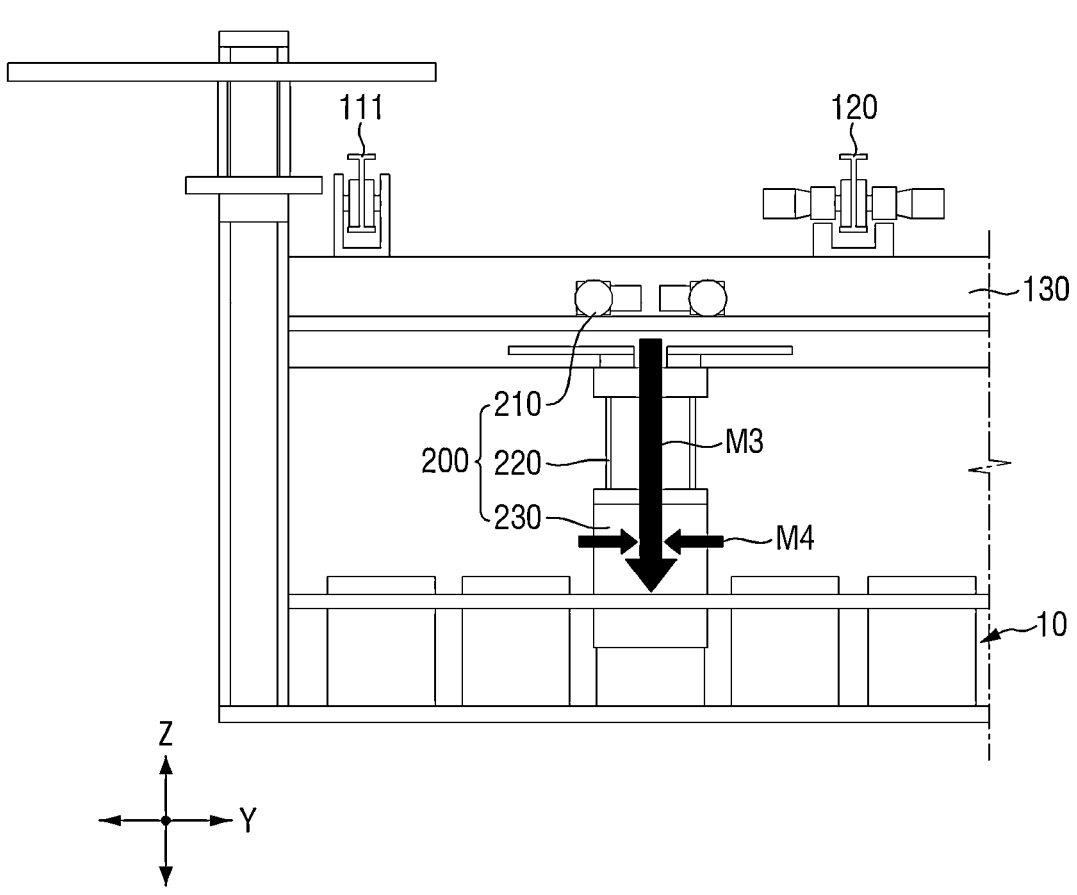
FIG. 10 is a view illustrating a pickup operation of a first transport vehicle.

FIG. 10 is a view illustrating a pickup operation of a first transport vehicle.

Referring to FIG. 10, the second driving rail 130 is moved in the first direction X.

Then, the carriage 210 of the first transport vehicle 200 moves in the second direction Y.

Then, the hoist 220 of the first transport vehicle 200 extends (downwardly) in the third direction Z (see reference numeral M3).

Then, the hand unit 230 of the first transport vehicle 200 grips the article (see reference numeral M4).

Then, the hoist 220 of the first transport vehicle 200 is shortened (upwardly) in the third direction Z.

Figure 11:
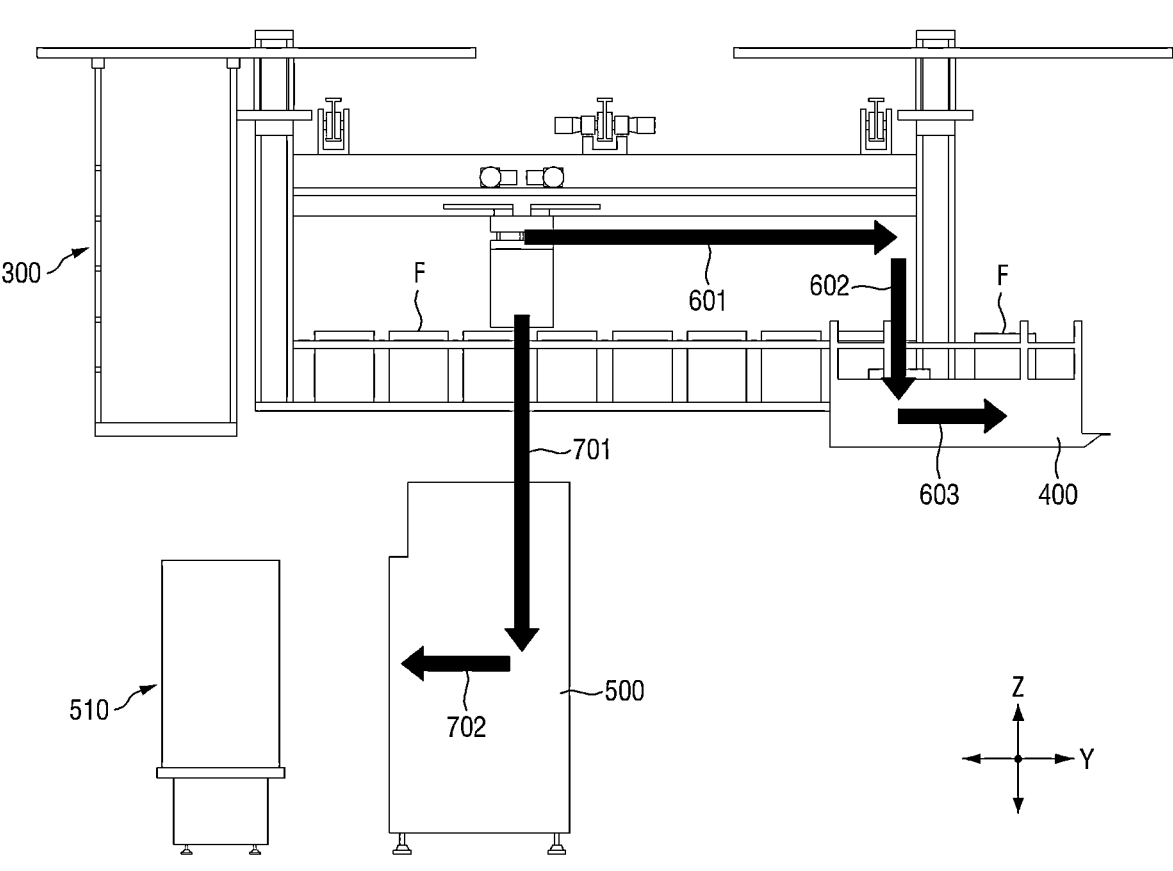
FIG. 11 is a view illustrating an operation using a first interface port and a second interface port.

FIG. 11 is a view illustrating an operation using a first interface port and a second interface port.

Referring to FIG. 11, the first transport vehicle 200 moves to the vicinity of the first interface port 400 while gripping an article F (see reference numeral 601).

Then, the first transport vehicle 200 puts the gripped article F down on the first interface port 400 (see reference numeral 602). The first transport vehicle 200 puts the gripped article F down on the conveyor system.

Then, the conveyor system of the first interface port 400 moves a position of the article F (see reference numeral 603).

Then, a transport apparatus OHT or another vehicle picks up and moves the article F moved on the first interface port 400.

As another example, the first transport vehicle 200 moves to the vicinity of the second interface port 500 while gripping the article F.

Then, the first transport vehicle 200 puts the article F down inside the second interface port 500 through an opened upper surface of the second interface port 500 (see reference numeral 701).

Then, the operator or the autonomous mobile vehicle 510 takes out and moves the article F from the second interface port 500 (see reference numeral 702).

Figure 12:
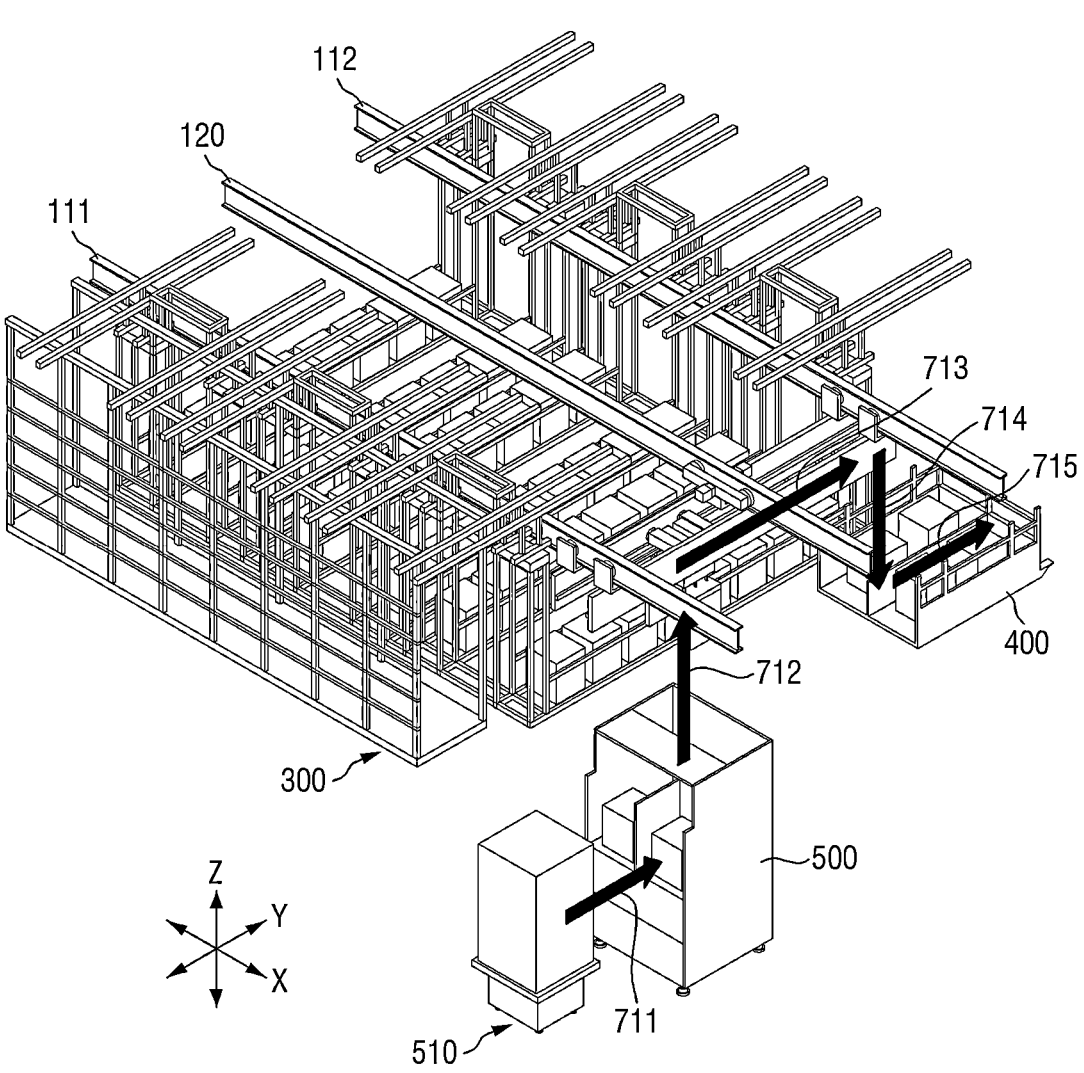
FIG. 12 is a view illustrating an operation using a first interface port and a second interface port.

FIG. 12 is a view illustrating an operation using a first interface port and a second interface port.

Referring to FIG. 12, the operator and/or the autonomous mobile vehicle 510 puts the article down inside the second interface port 500 (see reference numeral 711).

Then, the first transport vehicle 200 picks up the article from the inside of the second interface port 500 through the opened upper surface of the second interface port 500 (see reference numeral 712).

Then, the first transport vehicle 200 moves to the vicinity of the first interface port 400 while gripping the article (see reference numeral 713).

Then, the first transport vehicle 200 puts the gripped article down on the first interface port 400 (see reference numeral 714). The first transport vehicle 200 puts the gripped article down on the conveyor system.

Then, the conveyor system of the first interface port 400 moves a position of the article (see reference numeral 715).

Then, a transport apparatus OHT or another vehicle picks up and moves the article moved on the first interface port 400.

In this way, the operator and/or the autonomous mobile vehicle 510 may move the article to a desired position by successively using the second interface port 500 and the first interface port 400.

Figure 13:
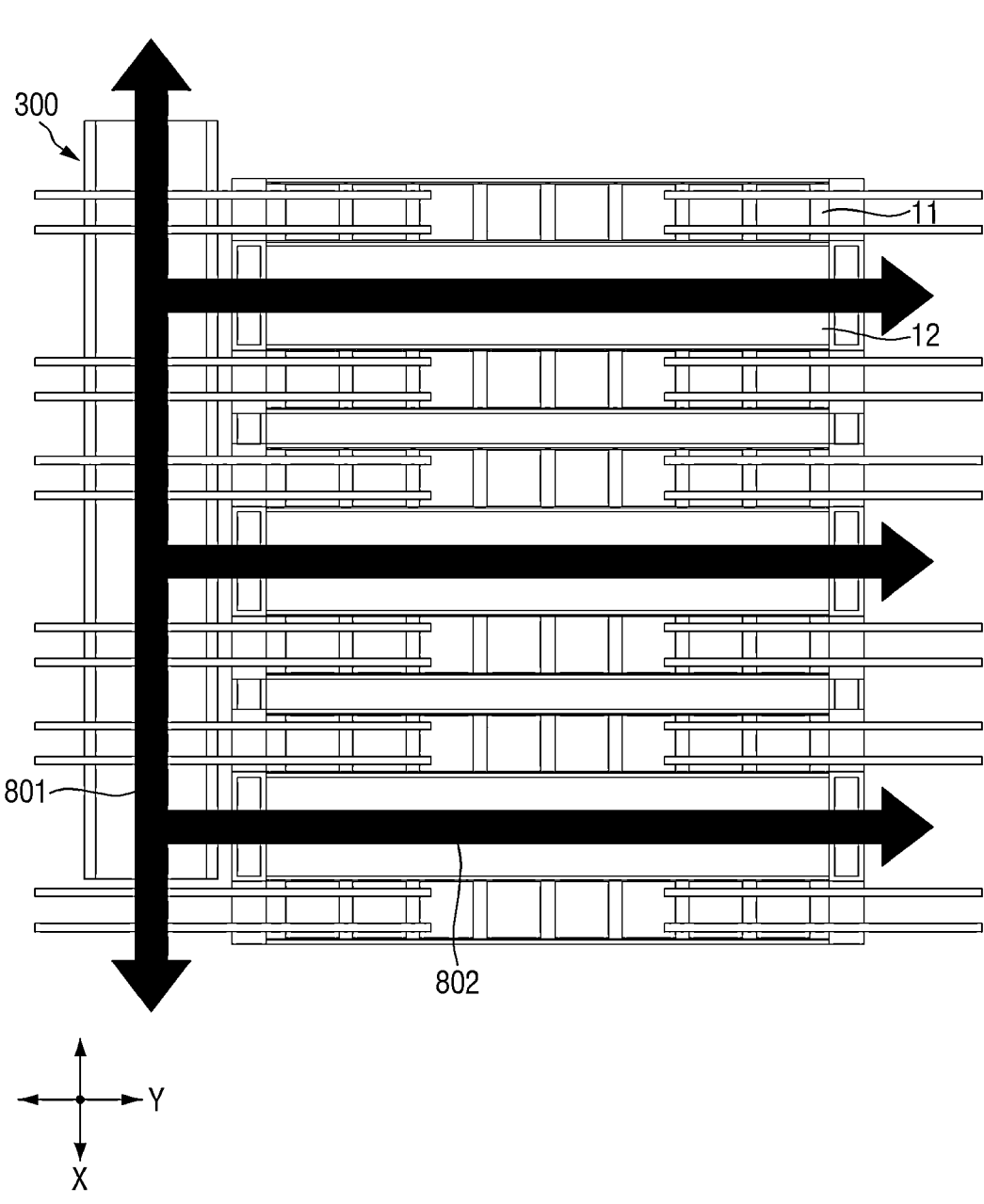
FIG. 13 is a view illustrating a maintenance operation of an operator.

FIG. 13 is a view illustrating a maintenance operation of an operator.

Referring to FIG. 13, the overhead rack 10 includes a plurality of storage areas 11 and a plurality of maintenance areas 12 disposed alternately with each other. The overhead rack further includes an access road 300, and the access road 300 is connected to the plurality of maintenance areas 12.

The operator moves along the access road 300 (see reference numeral 801).

Then, the operator enters at least one of the plurality of maintenance areas 12 (see reference numeral 802). The operator may enter the maintenance area 12 to repair the overhead rack 10 or to pick up the article in the storage area 11.

Figure 14:
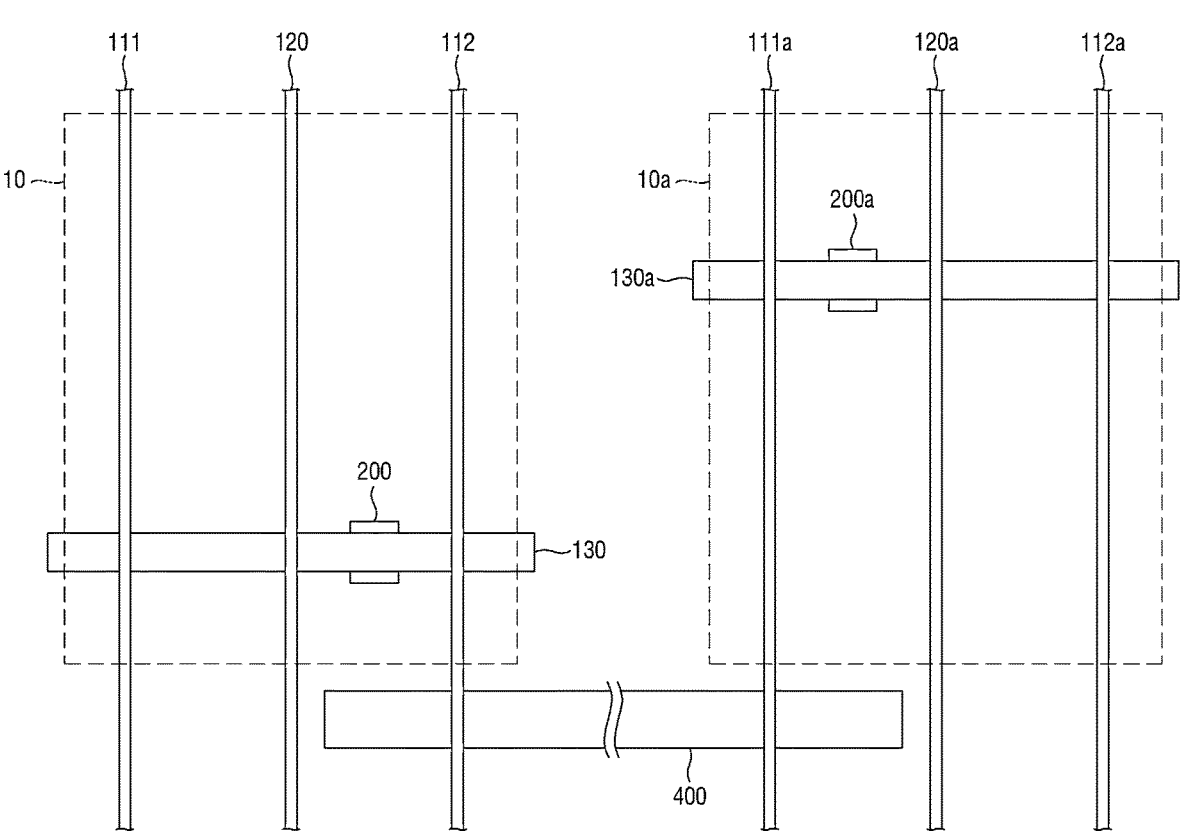
FIG. 14 is a plan view illustrating a ceiling storage system according to various example embodiments.
Figure 15:
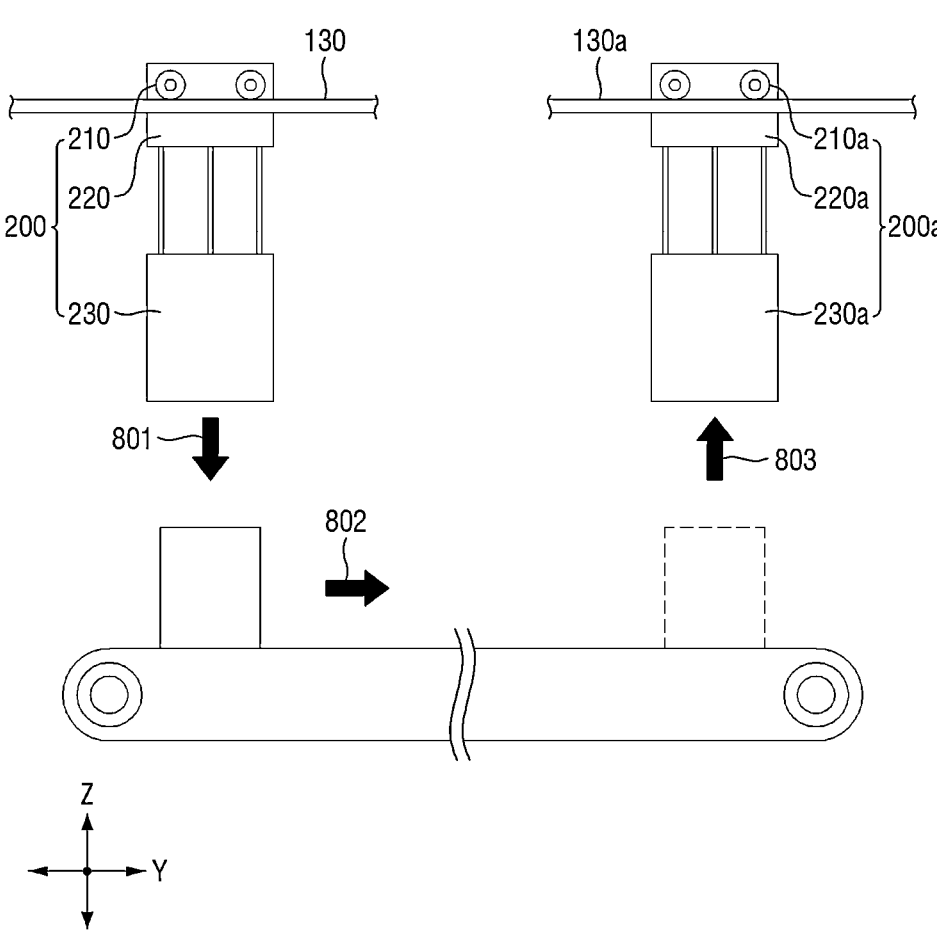
FIG. 15 is a side view of the ceiling storage system of FIG. 14.

FIG. 14 is a plan view illustrating a ceiling storage system according to various example embodiments. FIG. 15 is a side view of the ceiling storage system of FIG. 14.

Referring to FIGS. 14 and 15, a first overhead rack 10 and a second overhead rack 10a spaced apart from each other are disposed.

The first support rail 111, the second support rail 112, and the first driving rail 120 are disposed on the first overhead rack 10. The second driving rail 130 movably coupled to the first support rail 111, the second support rail 112, and the first driving rail 120 is installed on the first overhead rack 10. The first transport vehicle 200 coupled to the second driving rail 130 to be movable along the second driving rail 130 is disposed. The first transport vehicle 200 includes a carriage 210, a hoist 220, and a hand unit 230.

In addition, a support rail 111a, a support rail 112a, and a driving rail 120a are disposed on the second overhead rack 10a. A driving rail 130a movably coupled to the support rail 111a, the support rail 112a, and the driving rail 120a is installed on the second overhead rack A transport vehicle 200a coupled to the driving rail 130a to be movable along a driving rail 130a is disposed. The transport vehicle 200a includes a carriage 210a, a hoist 220a, and a hand unit 230a.

The first interface port 400 is disposed to be adjacent to the first overhead rack 10 and the second overhead rack 10a.

As illustrated in FIG. 15, the first transport vehicle 200 puts an article down on the first interface port 400 (see reference numeral 801).

Then, the conveyor system of the first interface port 400 moves a position of the article. The position of the moved article is near the second overhead rack 10a (see reference numeral 802).

Then, the transport vehicle 200a picks up the article moved on the first interface port 400 (see reference numeral 803).

Figure 16:
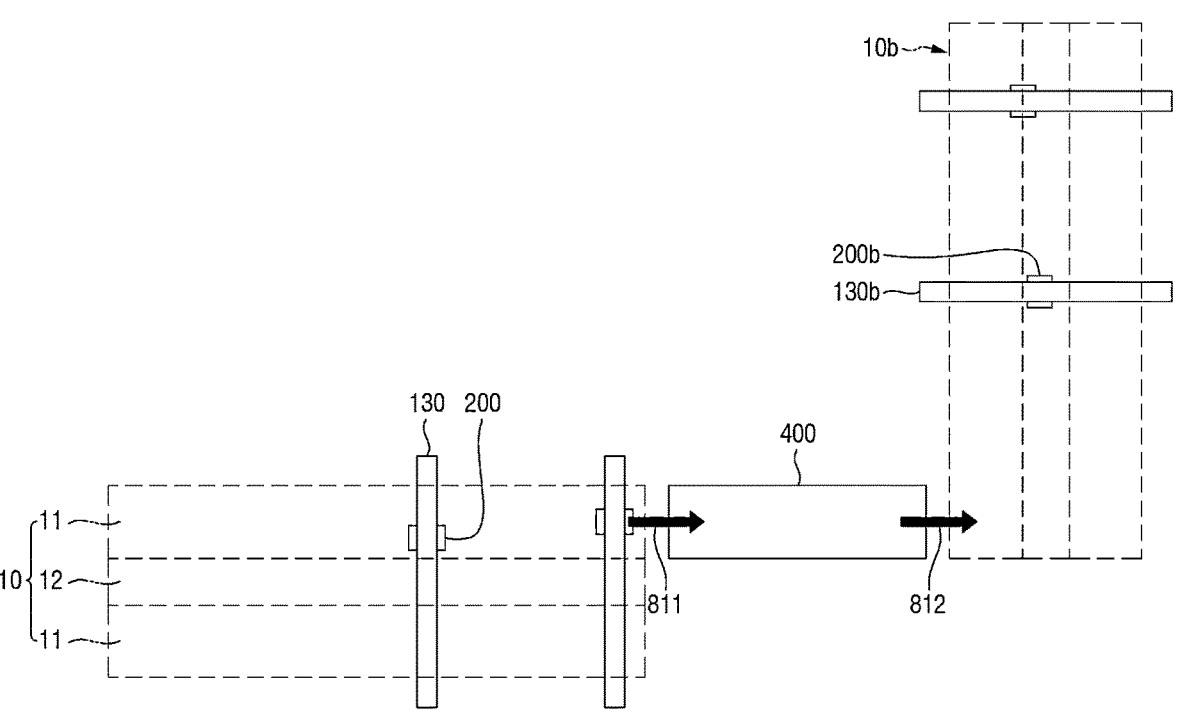
FIG. 16 is a plan view illustrating a ceiling storage system according to still various example embodiments.

FIG. 16 is a plan view illustrating a ceiling storage system according to still various example embodiments. Points different from those described with reference to FIGS. 14 and 15 will be mainly described.

In FIG. 14, the first overhead rack 10 and the second overhead rack 10a are disposed to be adjacent to each other, and the extending direction/moving direction of the second driving rail 130 and the extending direction/moving direction of the driving rail 130a are the same as each other.

On the other hand, in FIG. 16, the first overhead rack 10 and a third overhead rack 10b are far apart from each other, and the extending direction/moving direction of the second driving rail 130 and an extending direction/moving direction of a driving rail 130b are different from each other.

In FIG. 14, a short side of the first overhead rack 10 and a long side of the first interface port 400 face each other. A short side of the second overhead rack 10a and the long side of the first interface port 400 face each other.

On the other hand, in FIG. 16, the short side of the first overhead rack 10 and a short side of the first interface port 400 face each other. A short side of the third overhead rack 10b and the long side of the first interface port 400 face each other.

As illustrated in FIG. 16, the first transport vehicle 200 puts an article down on the first interface port 400 (see reference numeral 811).

Then, the conveyor system of the first interface port 400 moves a position of the article. The position of the moved article is near the third overhead rack 10b.

Then, a transport vehicle 200b picks up and moves the article moved on the first interface port 400 (see reference numeral 812).

Meanwhile, in FIG. 16, the extending direction (or length direction) of the storage area 11 of the first overhead rack 10 may intersect the extending direction (or length direction) of the second driving rail 130 without being parallel to each other.

Figure 17:
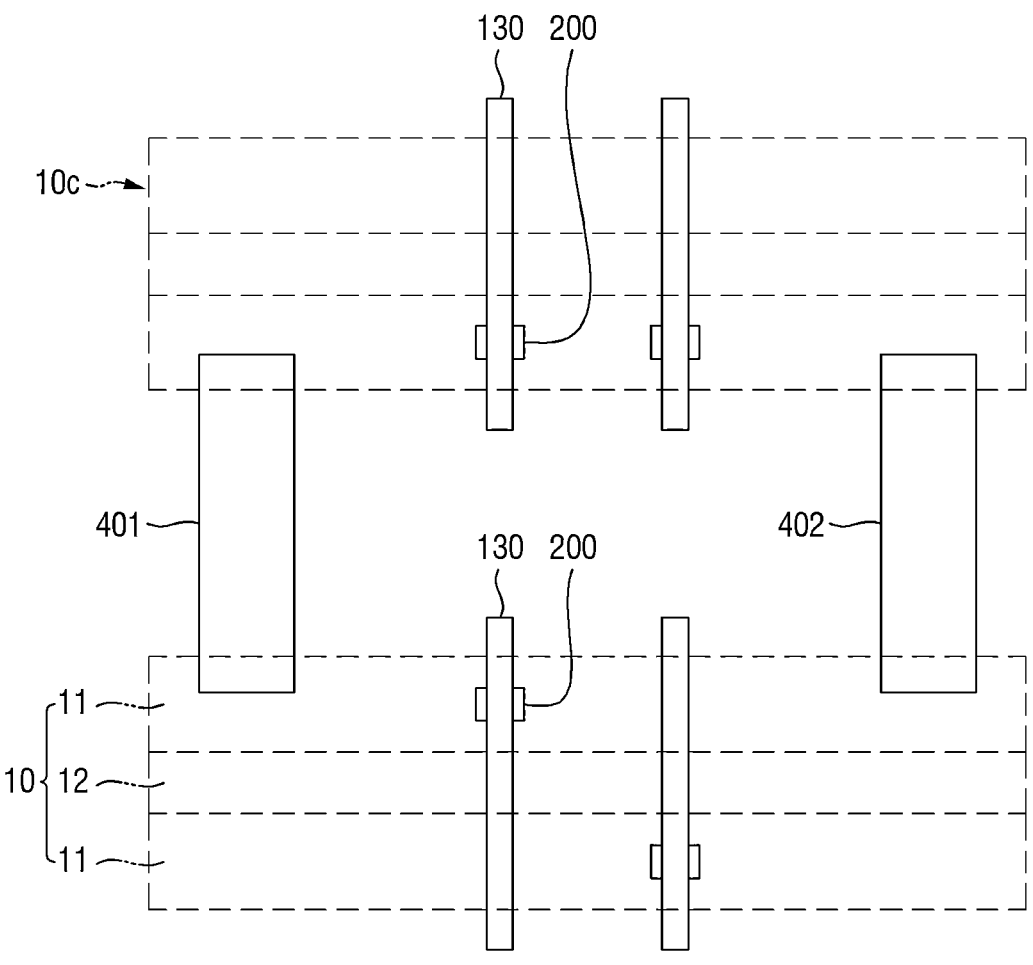
FIG. 17 is a plan view illustrating a ceiling storage system according to still various example embodiments.

FIG. 17 is a plan view illustrating a ceiling storage system according to still various example embodiments.

Referring to FIG. 17, the first overhead rack 10 and a fourth overhead rack 10c are disposed to be adjacent to each other, and the extending direction/moving direction of the second driving rail 130 and an extending direction/moving direction of a driving rail 130c are the same as each other.

A plurality of first interface ports 401 and 402 connect the first overhead rack 10 and the fourth overhead rack 10c.

A plurality of second driving rails 130 may move on the first overhead rack 10. A plurality of driving rails 130c may move on the fourth overhead rack 10c.

As an example operation, the first transport vehicle 200 is moved by the second driving rail 130, and puts the article down on the first interface port 401. Then, the conveyor system of the first interface port 401 moves a position of the article. The position of the moved article is near the fourth overhead rack 10c. Then, a transport vehicle 200c picks up and moves the article moved on the first interface port 401.

As another example, the transport vehicle 200c is moved by the driving rail 130c, and puts the article down on the first interface port 402. Then, the conveyor system of the first interface port 402 moves a position of the article. The position of the moved article is near the first overhead rack 10. Then, the first transport vehicle 200 picks up and moves the article moved on the first interface port 402.

Figure 18:
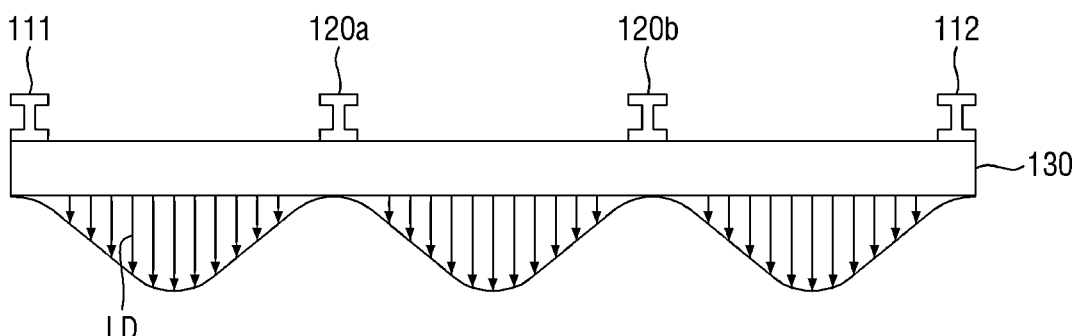
FIG. 18 is a side view illustrating a ceiling storage system according to still various example embodiments.

FIG. 18 is side view illustrating a ceiling storage system according to still various example embodiments. Points different from those described with reference to FIG. 1 will be mainly described.

Referring to FIG. 18, in a ceiling storage system according to still various example embodiments, the second driving rail 130 may be supported at four points instead of being supported at three points. For example, the second driving rail 130 is movably coupled to the first support rail 111, the second support rail 112, and the plurality of driving rails 120a and 120b.

Arrows illustrated in FIG. 18 illustrate a load LD by the second driving rail 130. The load of the second driving rail 130 may be stably supported by adjusting a gap between the first support rail 111 and the driving rail 120a, a gap between the driving rail 120a and the driving rail 120b, and a gap between the driving rail 120b and the second support rail 112.

Although not illustrated separately, the second driving rail 130 may be supported at five or more points. For example, when the second driving rail 130 is supported at five or more points, the second driving rail 130 may be installed on three support rails and two driving rails, or may be installed on two support rails and three driving rails.

Various example embodiments have been described above with reference to the accompanying drawings, but various example embodiments may be implemented in various different forms, and those of ordinary skill in the art to which example embodiments pertains may understand that example embodiments may be implemented in other specific forms without changing the technical spirit and/or essential features. Therefore, it should be understood that example embodiments described above are illustrative in all aspects and not restrictive. Furthermore, example embodiments are not necessarily mutually exclusive with one another. For example, some example embodiments may include one or more features described with reference to one or more figures, and may also include one or more other features described with reference to one or more other figures.

What is claimed is:

1. A ceiling storage system comprising:

a first overhead rack including a plurality of storage positions configured to store a plurality of articles;

first and second support rails above the first overhead rack and extending in one direction;

a first driving rail above the first overhead rack and parallel with the first and second support rails;

a second driving rail coupled to the first and second support rails and the first driving rail and configured to move along the first and second support rails and the first driving rail;

a first transport vehicle including, a carriage coupled to move along the second driving rail and configured to move along the second driving rail, and a hoist and hand unit installed on the carriage and configured to load and unload the articles to and from the first overhead rack; and a first port below the first overhead rack and having an opened upper surface, wherein the first port is configured to receive a first article from the first transport vehicle and hold the first article inside the first port prior to the first article being picked up by an entity, the entity including at least one of an operator or an autonomous mobile vehicle.

2. The ceiling storage system of claim 1, wherein the first overhead rack includes a plurality of storage areas and a plurality of maintenance areas, each storage area including the plurality of storage positions, and the plurality of storage areas and the plurality of maintenance areas are alternately arranged.

3. The ceiling storage system of claim 2, further comprising:

an access road extending in the one direction and connected to the plurality of maintenance areas, wherein the ceiling storage system is configured such that the operator has access to the plurality of maintenance areas through the access road.

4. The ceiling storage system of claim 1, further comprising:

a vision camera installed in the hand unit, wherein the ceiling storage system is configured such that a loading and unloading operation is performed after detecting a position of a second article in the first overhead rack by performing auto teaching with the vision camera.

5. The ceiling storage system of claim 1, wherein the first driving rail is between the first support rail and the second support rail.

6. The ceiling storage system of claim 5, further comprising:

a plurality of first driving rails between the first support rail and the second support rail, wherein the plurality of first driving rails are arranged in parallel with the first and second support rails.

7. The ceiling storage system of claim 1, wherein the second driving rail extends in a direction perpendicular to the one direction.

8. The ceiling storage system of claim 1, further comprising:

a first interface port adjacent to the first overhead rack; and a second transport vehicle configured to move along an overhead rail, wherein the first transport vehicle is configured to pick up a second article from the first overhead rack and to move the second article to the first interface port, and the second transport vehicle is configured to pick up and move the second article from the first interface port.

9. The ceiling storage system of claim 8, wherein the first interface port includes a conveyor system configured to move the second article in a specific direction, the first transport vehicle is configured to put the second article down on one side of the conveyor system, and the second transport vehicle is configured to pick up the second article from the other side of the conveyor system.

10. The ceiling storage system of claim 1, wherein the first transport vehicle is configured to pick up the first article from the first overhead rack and to move the first article to the first port through the opened upper surface, and the ceiling storage system is configured such that the operator or the autonomous mobile vehicle can pick up and move the first article from the first port.

11. The ceiling storage system of claim 1, further comprising:

a second overhead rack spaced apart from the first overhead rack;

a second transport vehicle on the second overhead rack and configured to load and unload a second article; and a first interface port adjacent to the first overhead rack and the second overhead rack, wherein the first transport vehicle is configured to pick up the second article from the first overhead rack and to move the second article to the first interface port, and the second transport vehicle is configured to pick up the second article from the first interface port and to move the second article to the second overhead rack.

12. A ceiling storage system comprising:

a first overhead rack in which a plurality of storage areas and a plurality of maintenance areas are alternately arranged;

first and second support rails above the first overhead rack and extending in one direction;

a first driving rail above the first overhead rack and between the first support rail and the second support rail;

a second driving rail coupled to the first and second support rails and the first driving rail and configured to move along the first and second support rails and the first driving rail;

a first transport vehicle including a carriage coupled to move along the second driving rail and configured to move along the second driving rail, and a hoist and hand unit installed on the carriage and configured to load and unload an article to and from the first overhead rack;

a first interface port adjacent to the first overhead rack; a second interface port below the first overhead rack and having an opened upper surface; and a second transport vehicle configured to move along an overhead rail, wherein the first transport vehicle is configured to pick up the article from the first overhead rack and to move the article to the first interface port, and the second transport vehicle is configured to pick up and move the article from the first interface port, and wherein the first transport vehicle is configured to pick up the article from the first overhead rack and move the article to the second interface port through the opened upper surface, wherein the ceiling storage system is configured such that an operator or an autonomous mobile vehicle can pick up and move the article from the second interface port, and wherein the second interface port is configured to receive the article from the first transport vehicle and hold the article inside the second interface port prior to the article being picked up by an entity, the entity including at least one of the operator or the autonomous mobile vehicle.

13. The ceiling storage system of claim 12, further comprising:

an access road extending in the one direction and connected to the plurality of maintenance areas, wherein the access road is configured such that the operator can have access to the plurality of maintenance areas through the access road.

14. The ceiling storage system of claim 12, further comprising:

a vision camera installed in the hand unit, wherein the ceiling storage system is configured such that a loading and unloading operation is performed after detecting a position of the article in the first overhead rack by performing auto teaching with the vision camera.

15. The ceiling storage system of claim 12, further comprising:

a plurality of first driving rails above the first overhead rack and between the first support rail and the second support rail, wherein the plurality of first driving rails are arranged in parallel with the first and second support rails.

16. The ceiling storage system of claim 12, further comprising:

a second overhead rack spaced apart from the first overhead rack;

a third transport vehicle on the second overhead rack and configured to load and unload the article; and a third interface port adjacent to the first overhead rack and the second overhead rack,

wherein the first transport vehicle is configured to pick up the article from the first overhead rack and to move the article to the third interface port, and the third transport vehicle is configured to pick up the article from the third interface port and to move the article to the second overhead rack.

17. A control method of a ceiling storage system, the control method comprising:

providing the ceiling storage system including a first overhead rack, a first support rail, a second support rail, a first driving rail disposed above the first overhead rack and extending in a first direction, a second driving rail movably coupled to the first support rail, the second support rail, and the first driving rail, a first transport vehicle movable along the second driving rail, a first interface port disposed to be adjacent to the first overhead rack, and a second interface port disposed below the first overhead rack and having an opened upper surface, the second interface port being configured to receive an article from the first transport vehicle and hold the article inside the second interface port prior to the article being picked up by an entity, the entity including at least one of an operator or an autonomous mobile vehicle;

moving the second driving rail along the first driving rail in the first direction;

moving the first transport vehicle along the second driving rail in a second direction perpendicular to the first direction;

extending a hoist of the first transport vehicle in a third direction perpendicular to the first direction and the second direction; and picking up articles loaded on the first overhead rack by a hand unit of the first transport vehicle.

18. The control method of claim 17, wherein the ceiling storage system further includes a second transport vehicle moving along an overhead rail, the first transport vehicle moves the picked-up article to the first interface port, and the second transport vehicle picks up and moves the article from the first interface port.

19. The control method of claim 18, wherein the first interface port includes a conveyor system for moving the article in a specific direction, the first transport vehicle puts the article down on the conveyor system, the conveyor system moves a position of the article, and the second transport vehicle picks up the article moved on the conveyor system.

20. The control method of claim 17, wherein the first transport vehicle picks up the article from the first overhead rack and moves the article to the second interface port through the opened upper surface, and the operator or the autonomous mobile vehicle picks up and moves the moved article from the second interface port.

* * * * *